Figure 1:
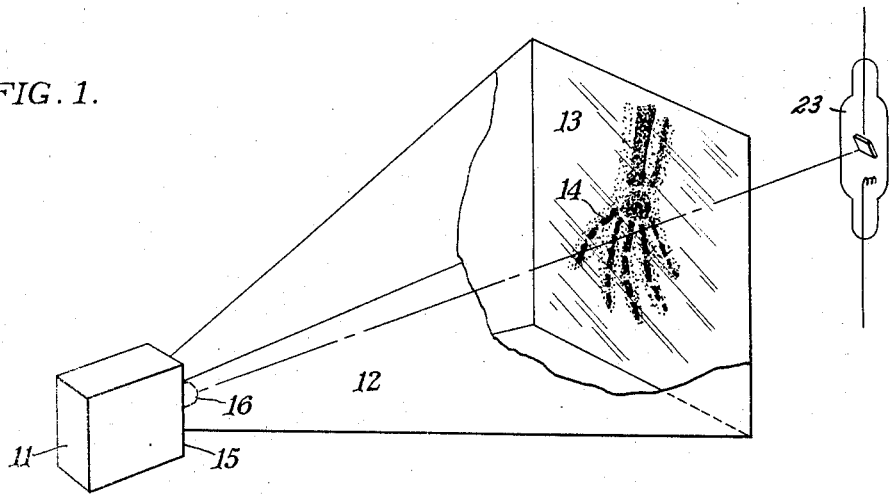

Oct. 11, 1949.    E. O. WANGERIN ET AL    2,484,436
SHUTTER ALARM
Filed Oct. 13, 1944

ELMER O. WANGERIN
RICHARD K. WALKER
INVENTORS
ATTORNEYS

Patented Oct. 11, 1949

2,484,436

UNITED STATES PATENT OFFICE 2,484,436

SHUTTER ALARM

Elmer O. Wangerin and Richard K. Walker, Rochester, N. Y., assignors to Eastman Kodak Company, Rochester, N. Y., a corporation of New Jersey Application October 13, 1944, Serial No. 558,519

8 Claims. (Cl. 250—65)

The present invention relates to a photographic camera, and more particularly, although not exclusively, to a camera intended for use in photographing an X-ray image formed on a fluorescent screen by an X-ray emitting apparatus.

In an apparatus of this type, the camera may be placed at one end of a dark tunnel, the other end of which has mounted therein a fluorescent screen adapted to be excited by the X-rays formed by an X-ray generating set. With such an arrangement, the exposure is determined by the X-ray apparatus. For this reason, it is desirable to have a camera shutter or light blocking member completely open whenever the camera is secured to the dark tunnel. However, in order to prevent wastage of film and to insure that the desired exposure is made, it is essential that the camera shutter be moved to its fully open position prior to the making of an exposure. In addition, it may be desirable to interchange the cameras or to remove the camera to a darkroom to detach the exposed portion of the film. Obviously, before the camera is detached from the dark tunnel, the shutter should be moved to its closed or light-trapping position to prevent the inadvertent exposure or fogging of the film.

The present invention has, therefore, as its principal object, the provision of an arrangement which effectively prevents the making of an exposure until the shutter has been moved to its fully open position.

A further object of the invention is the provision of a signaling device which is rendered effective when an exposure is attempted with the shutter in a position other than its fully open position.

Still another object of the invention is the provision of a second signaling device which becomes operative when the shutter has been fully closed to indicate that the camera may be safely removed from the dark tunnel.

To these and other ends, the invention resides in certain improvements and combinations of parts, all as will be hereinafter more fully described, the novel features being pointed out in the claims at the end of the specification.

Figure 2:
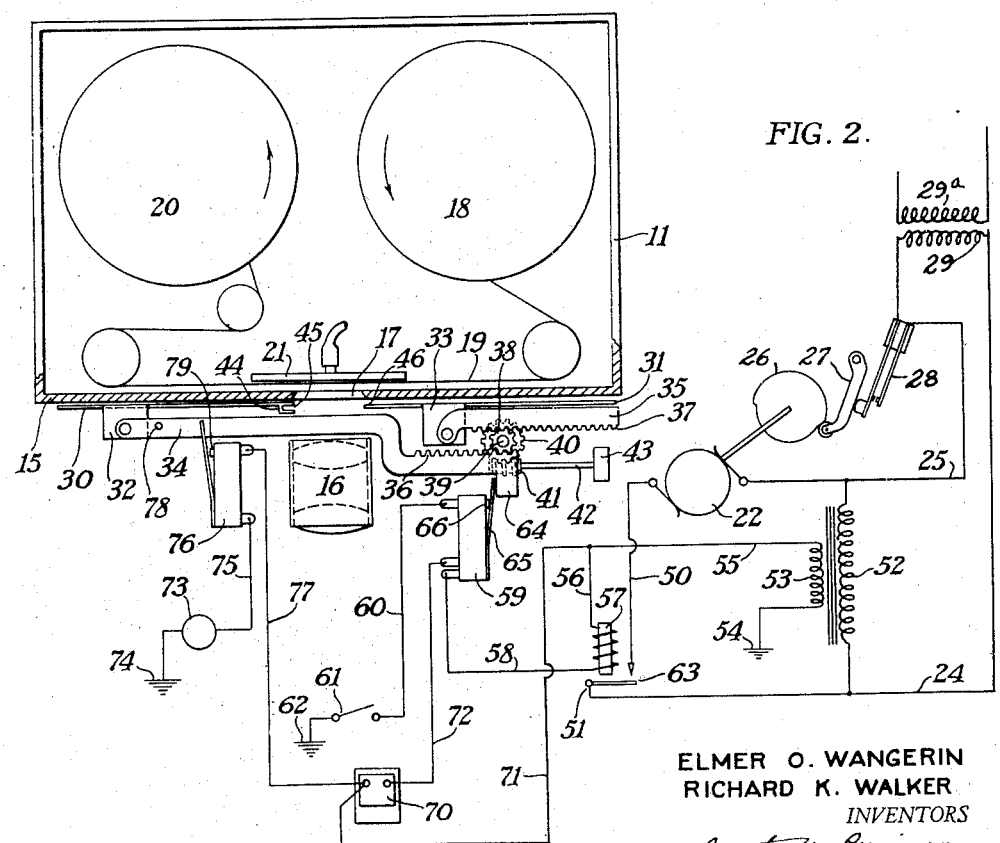

In the drawings:

Fig. 1 is a perspective view showing the relation of a camera, dark tunnel, and fluorescent screen, the tunnel being broken away to show the image formed by the X-ray generating set on the fluorescent screen; and Fig. 2 is a view of the camera, with parts in section, showing the wiring diagram of the various controls and signal devices.

Similar reference numerals throughout the various views indicate the same parts.

The camera 11 is mounted in one end of a dark tunnel 12, the opposite end of which carries a fluorescent screen 13 on which an image 14 may be formed by a suitable X-ray emitting apparatus, broadly indicated by the numeral 23. The screen 13 is positioned in alignment with the camera so that the latter may photographically record the image formed on the screen, as will be apparent. The tunnel 12 may be made of any suitable material to provide a light-tight chamber connecting the camera and the fluorescent screen.

The camera comprises a box-like portion on the front wall 15 of which is mounted a lens tube 16 arranged in alignment with an exposure aperture 17. The interior of the camera has mounted therein a supply spool or reel 18 from which a film strip 19 is drawn and passed over the exposure aperture 17 and finally wound up on a take-up spool or reel 20. A movable platen 21 is positioned across the exposure aperture 17 and is adapted to have a suction applied thereto to hold the film in a plane during the exposure.

A motor 22 is provided for driving the various members in proper timed relation and is adapted to be connected, in a manner to be later described, to the supply lines 24 and 25. This motor both operates and controls an exposure cycle which operates in the following sequence:

Upon starting the motor, the platen 21 is first lowered into contact with the portion of film strip 19 positioned across the exposure aperture and a vacuum forming means, such as a bellows, not shown, is then actuated to supply a suction to the platen to hold the film thereagainst during the exposure. A cam 26 on the shaft of the motor 22 then pivots a follower 27 to close a switch 28 connected to the supply lines 24 and 25 through the primary 29 of a transformer, the secondary 29a of which is connected to the X-ray generating apparatus to render the tube 23 effective to form an image on the screen 13. The length of the exposure is controlled entirely by the duration of operation of the X-ray device. After the exposure is made, the motor then winds up the exposed film onto the take-up spool 20 and draws a fresh portion from the supply spool 18 into position over the aperture 17. As these various controls for the platen bellows, X-ray machine and film winding mechanism form no part of the present invention, a further showing thereof is not deemed necessary. Only so much of the camera structure as is necessary to a full and complete understanding of the present invention will be illustrated and described.

The exposure aperture 17 may be covered and uncovered by means of a shutter or a light blocking member or trap in the form of a pair of laterally movable slide members or plates 30 and 31 formed with depending lugs 32 and 33 adapted to be connected to arms 34 and 35 respectively, all as clearly illustrated in Fig. 2. The arms 34 and 35 are of the shape best shown in Fig. 2 and have their ends brought into adjacent relation and provided with racks 36 and 37 respectively. A pinion 38, mounted on a shaft 39, is positioned between and engages the two racks 36 and 37. It will now be apparent that if the pinion 38 is rotated in a clockwise direction, the slide members 30 and 31 will move away from each other to open the aperture 17, while a counter-clockwise rotation of the pinion 38 will move the slides 30 and 31 towards each other to close the aperture 17. The shaft 39 also carries a second pinion 40 which meshes with a worm 41 carried by a shaft 42, the outer end of which carries a finger-knob 43 by which the slides 30 and 31 may be moved or adjusted, as is apparent.

When the slide members 30 and 31 are moved to their aperture closing position, it is essential that they form an effective shield or light trap to protect the film against exposure or fog. To secure this result, the inner end of the slide member 30 is provided with a bifurcated member 44 having a shaped slot or groove 45 adapted to receive a similarly shaped end 46 on the slide member 31. When the slide members are closed the end 46 extends into the slot 45 to provide an effective light lock so that the camera may be safely dismounted from the tunnel 12.

In order to prevent the initiation of the exposure cycle until the slide members 30 and 31 have been moved to their fully open position, the present invention provides an arrangement by which the circuit to the drive motor 22 cannot be closed or completed until the slide members are moved to completely uncover the exposure aperture 17, as shown in Fig. 2. To secure this result, one side of the motor 22 is connected to the supply line 25 while the other side of the motor is connected to the other supply line 24 through a lead 50 and a normally open switch 51. It will be readily apparent, therefore, that the motor 22 cannot be started until the switch 51 is closed, and the closing of the latter is controlled by the slide members and only when the latter are open to fully uncover the aperture 17.

To this end, the primary 52 of a transformer is connected across the supply lines 24 and 25 and in parallel relation with the motor 22, as is apparent from an inspection of Fig. 2. The secondary 53 of the transformer has one side 54 thereof grounded while the other side is connected through the leads 55 and 56 to a relay 57 positioned adjacent the switch 51. The relay 57 is in turn connected by the lead 58 to a single pole double-throw switch 59. As the construction of the latter switch is well known, details thereof are not deemed necessary. The switch 59 is then connected through the lead 60 to a manually actuated control switch 61, the other side of which is grounded as shown at 62.

It will now be apparent that the switch 59 may be closed in one direction to connect the switch 61 and the relay 57 in series so that when the switch 61 is manually closed a circuit will be completed from the ground 62, switch 61, lead 60, switch 59, lead 58, relay 57, and leads 56 and 55 to the transformer secondary 53 and then to the ground 54. Such completion of the circuit will energize the relay 57 to raise the movable arm 63 of the switch 51 to complete the circuit through the motor 22. To insure, however, that the motor 22 will not be started until the slide members 30 and 31 are moved to their opened position to uncover the aperture 17, the end of arm 34 of a member 30 is provided with a depending lug 64 which, when the slide members have been fully opened, engages a lever 65 on the switch 59 to move the lever into engagement with the plunger 66 thereof to then position the switch 59 to connect the switch 61 into the circuit of and in series relation with the relay 57. Thus the motor is controlled by the slide members 30 and 31 and is rendered operative only when the members have been moved to their fully open position, as shown in Fig. 2. When, however, the slide members are in their fully open position, the closing of the manually controlled switch 61 will serve to automatically close the switch 51 through the relay 57 to thus energize the motor to start the exposure cycle.

As mentioned above, the slide members 30 and 31 should be fully open during the exposure cycle. If, however, the members have been inadvertently or accidentally moved from such position, the desired result may not be secured. For this reason, the present invention provides an arrangement by which the movement of the slide members from their open position, even by a slight amount, will not only automatically render the motor 22 ineffective, but will also actuate an alarm system to positively notify the operator that the slide members are not fully open. The alarm comprises, in the present embodiment, a bell or buzzer 70 connected by a lead 71 to the lead 55 which, in turn, is connected to the transformer secondary 53. Another lead 72 connects the buzzer 70 to the switch 59. Now when the slide members are moved from the fully open position, the lug 64 moves away from the arm 65 to release the plunger 66 of the switch 59. Such release serves to automatically disconnect the lead 58 and relay 57 from the switch 59 and simultaneously connect the lead 72 to the switch 59 to place the buzzer 70 in series therewith. Now when the switch 61 is closed, the circuit will be from the ground 62 through switch 61, lead 60, switch 59, lead 72, buzzer 70, and leads 71 and 55 to the secondary 53 and to the ground 54 thereof. When such a circuit is completed by the closing of the switch 61, the buzzer will sound to provide a positive, audible signal, which will notify the operator that the slides 30 and 31 are not open. As the relay 57 has been now disconnected from the switch 59, the motor will remain stationary and the exposure cycle will not become operative. The operator may now turn the knob 43 to open fully the slide members to again connect the relay 57 in series relation with the switch 61 and to automatically and simultaneously disconnect the latter from the buzzer 70 to render the latter inoperative.

Now upon closing the switch 59, the exposure cycle will be initiated, as pointed out above.

The present invention thus provides a control and alarm system by which the starting of the exposure cycle is possible only when the shutter or light blocking slide members are in fully open position to completely uncover the exposure aperture. If, for any reason, the slide members are moved from such open position, the drive motor is automatically disconnected, electrically, and a signaling member is cut in so that if any exposure is attempted, the alarm will sound to indicate that the slide members are not fully open, and the proper adjustment thereof may then be made.

If the camera is to be disconnected from the dark tunnel 12 to interchange cameras or to take the camera to a darkroom to remove the exposed film or to reload the camera, it is imperative that the slide members 30 and 31 be moved to their fully closed position to bring the end 46 of the member 31 into the slot 45 of the member 30 to provide a light lock to prevent exposure or fogging of the film. To insure that the slide members are fully closed and the light lock operative before the camera is removed, the present invention further provides a signal which will indicate when the slide members have been moved to their closed position, and that it is safe to remove the camera.

This signaling system comprises a lamp 73, one side of which is grounded at 74 while the other side is connected by the lead 75 to a single pole, single-throw switch 76 which, in turn, is connected by a lead 77 to the lead 71 at the buzzer 70, as clearly illustrated in Fig. 2. Now when the switch 76 is closed a circuit will be formed from the ground 74, lamp 73, lead 75, switch 76, leads 77, 71 and 55 to the secondary 53 of the transformer and the ground 54. The closing of the switch 76, is, however, under the control of the slide members 30 and 31 and is closed only when the slide members have reached their fully closed position to afford an effective light lock which will protect the film against exposure or fogging through the exposure aperture 17.

The closing means for the switch 76 is in the form of a protruding pin 78 on the arm 34 of the slide member 30. When the slide members are moved to the closed position, the member 30 and the arm 34 are moved to the right and when the slide members reach their fully closed position, the pin 78 engages the spring arm of the switch 76 and moves the arm into engagement with the plunger 79 to close the switch to connect the lamp 73, switch 76, and the transformer secondary 53 in a series relation to illuminate the lamp to readily indicate that the slide members are fully closed and that the camera may be safely removed from the dark tunnel. By means of this arrangement, the film is effectively protected against exposure or fogging when the camera is removed.

The above described controls and alarm thus effectively prevent the making of an exposure when the slide members are not in their fully open position. Any attempt to make an exposure when the members are not fully open will actuate an alarm to clearly and positively indicate to the operator that the exposure aperture is not fully uncovered. When, however, the slide members are fully opened, the closing of the control which will initiate the exposure cycle to form an image on the fluorescent screen and to photograph the image. A signal is also provided to enable the operator to ascertain when the slide members have been moved to their fully closed positions and it is safe to remove the camera from the dark tunnel. The various alarms and controls shown in Fig. 2 are built into the camera housing and are movable as a unit therewith.

While one embodiment of the invention has been disclosed, it is to be understood that the inventive idea may be carried out in a number of ways. This application is, therefore, not to be limited to the precise details described, but is intended to cover all variations and modifications falling within the scope of the appended claims.

We claim:

1. In a camera having an exposure aperture and adapted for use in connection with a fluorescent screen on which an image may be formed by an X-ray apparatus, the combination with an electrical circuit, and a motor connected in said circuit for controlling said camera and apparatus, of a switch connected into the circuit of said motor, a second electrical circuit independent of said first circuit, means in said second circuit adapted when energized to close said switch, a manually-actuated control switch adapted to be connected into said second circuit, slide members adapted to be moved to cover and uncover said aperture, means for moving said slide members, and a switching mechanism positioned to be engaged and closed when said slides are moved to open position to connect said control switch to said closing means to close said first circuit to energize said motor to render the latter operative for controlling said exposure cycle.

2. In a camera having an exposure aperture and adapted for use in connection with a fluorescent screen on which an image may be formed by an X-ray apparatus, the combination with an electrical circuit, and a motor connected in said circuit for controlling said camera and apparatus, of a switch connected into the circuit of said motor, a second electrical circuit independent of said first circuit, means in said second circuit adapted when energized to close said switch, a manually-actuated control switch adapted to be connected into said second circuit, slide members adapted to be moved to cover and uncover said aperture, means for moving said slide members, a third electrical circuit, an audible signaling member connected into said third circuit, and a switching mechanism adapted to be engaged by one of said slide members and moved to one position when said members are in position to fully uncover said aperture to connect said control switch to said switch closing means to close said first switch to thereby connect the motor in said circuit, said mechanism being automatically movable to another position when said slide members are moved from their fully open position to disconnect said switch opening means from said control switch and simultaneously to connect the latter to said signaling device to energize the latter to audibly indicate that the slide members are not in their fully opened positions.

3. Apparatus for the production of photographs of images formed on a screen by an image-producing device, said apparatus having an exposure aperture arranged in alignment with said screen and comprising in combination, an electric motor for controlling said apparatus and said device, an electrical circuit for said motor, a normally open switch arranged in said circuit, a second electrical circuit, means arranged in said second circuit for closing said switch, a manually-actuated switch in said second circuit, a member movable to open and close said aperture, a second normally open switch arranged in said second circuit and in series with said second switch and said closing means, said third switch being closable by said member when the latter is moved to fully open said aperture to connect said second switch to said closing means to energize the latter to close said first switch to connect said motor to said first circuit, a third electrical circuit, signaling means arranged in said third circuit, and means for automatically disconnecting said third switch from said closing means and simultaneously connecting it to said signaling means when said member is moved from said open position so that the closing of said control switch will actuate said signaling means to indicate that said member has been moved from a fully open position.

4. Apparatus for the production of photographs of images formed on a screen by an image-producing device, said apparatus having an exposure aperture arranged in alignment with said screen and comprising, in combination, an electric motor for controlling said apparatus and said device, an electrical circuit for said motor, a normally-open switch arranged in said circuit, a second electrical circuit, a relay connected in said second circuit and adapted when energized to close said switch to energize said motor, a manually-actuated control switch adapted to be connected into said second circuit, a pair of slides movable toward and away from each other to cover and uncover said aperture, means for moving said slides, an actuating member carried by one of said slides, and a third switch member positioned in the path of said actuating member and arranged to be moved thereby to close said third switch only when said slides have been moved to their fully open position to connect said second switch to said relay to energize the latter to close said first switch to thereby connect said motor into said first circuit.

5. Apparatus for the production of photographs of images formed on a screen by an image-producing device, said apparatus having an exposure aperture arranged in alignment with said screen and comprising in combination, an electric motor for controlling said apparatus and said device, an electrical circuit for said motor, a normally-open switch arranged in said circuit, a second electrical circuit, a relay connected in said second circuit and adapted when energized to close said switch to energize said motor, a manually-actuated control switch adapted to be connected into said second circuit, a pair of slides movable toward and away from each other to cover and uncover said aperture, means for moving said slides, an actuating member carried by one of said slides, a third electrical circuit, an audible signaling device connected in said third circuit, and a multiple switching member adapted to be engaged and moved by said slides to one position when the latter are in their fully opened position to connect said second switch to said relay to energize the latter to close said first switch to thereby connect said motor in said first circuit, said switching member being automatically movable to another position by said slides when the latter are moved from their fully opened position to disconnect said relay from said second switch and simultaneously to connect the latter to said signalling device to energize the latter to thereby audibly indicate that said slides are not in their fully open position.

6. Apparatus for the production of photographs of images formed on a screen by an image-producing device, said apparatus having an exposure aperture arranged in alignment with said screen and comprising in combination, operating means for said device, control means for said operating means, means for actuating said control means, an exposure control element for said device, a member movable to open and close said aperture, signaling means, said actuating means being automatically disconnected from said control means when said member is positioned intermediate its open and closed positions, and means engaged by said member when the latter reaches its fully closed position for actuating said signaling means to indicate that said member now fully closes said aperture.

7. Apparatus for the production of photographs of images formed on a screen by an image-producing device, said apparatus having an exposure aperture arranged in alignment with said screen and comprising in combination, control means for said operating means, means for actuating said control means, an exposure control element for said device, operating means for said device, a member movable to open and close said aperture, means adapted to be moved by said member and rendered operative only when said member is moved to its fully open position to connect said element to said control means to render the latter effective to permit the operation of said device to form said image, signaling means, means for connecting said signaling means to said operating means when said member has been moved from its open position to actuate said signaling means upon operation of said operating means, a second signaling means independent of said first signaling means, and means controlled by said member when the latter reaches a position to fully close said aperture to actuate said second signaling means to indicate that said aperture is closed.

8. In a camera having an exposure aperture and adapted for use in connection with a fluorescent screen on which an image may be formed by an X-ray apparatus, the combination with an electric motor for controlling the operation of said camera and apparatus, of an electric circuit in which said motor is connected, a normally open switch arranged in said circuit, a second electrical circuit, a relay connected in said second circuit and adapted when energized to close said switch to energize said motor, a manually-actuated control switch adapted to be connected into said second circuit, a pair of slides movable toward and away from each other to cover and uncover said aperture, means for moving said slides, an actuating member carried by one of said slides, a third electrical circuit, an audible signaling device connected in said third circuit, a multiple switching member adapted to be engaged and moved by one of said slides to one position when the latter are in their fully open position to connect said control switch to said relay to energize the latter to close said first switch to thereby connect said motor in said first circuit, said switching member being movable to another position when said slides are moved from their fully opened position to disconnect said relay from said control switch and simultaneously to connect the latter to said signaling device to energize the latter to thereby audibly indicate that said slides are not in their fully open position when said manually-actuated switch is closed, a fourth electric circuit, a second signal device connected into said fourth circuit, and a second switching mechanism adapted to be engaged by said slides when the latter are moved to a position to close completely said aperture and to be connected in series with said second signal device to energize the latter to indicate that said slides are in aperture-closing position.

ELMER O. WANGERIN.
RICHARD K. WALKER.

REFERENCES CITED

The following references are of record in the file of this patent:

UNITED STATES PATENTS

| Number | Name | Date |
|---|---|---|
| 1,159,179 | Courson | Nov. 2, 1915 |
| 1,221,063 | Lare | Mar. 3, 1917 |
| 1,963,095 | Petit | June 19, 1934 |
| 2,045,549 | Freedman | June 23, 1936 |
| 2,166,440 | Jones | July 18, 1939 |
| 2,331,225 | Powers | Oct. 5, 1943 |
| 2,337,722 | Konigsberg | Dec. 28, 1943 |
| 2,360,136 | Jany | Oct. 10, 1944 |